United States Patent
Emoto et al.

(10) Patent No.: US 8,393,291 B2
(45) Date of Patent: Mar. 12, 2013

(54) LIQUID APPLICATION APPARATUS AND APPLICATION METHOD

(75) Inventors: Kazutoshi Emoto, Tokyo (JP); Kiyonori Hinoki, Tokyo (JP); Masahiro Saegusa, Tokyo (JP); Haruka Nishimura, Tokyo (JP)

(73) Assignee: TDK Corporation, Tokyo (JP)

( * ) Notice: Subject to any disclaimer, the term of this patent is extended or adjusted under 35 U.S.C. 154(b) by 477 days.

(21) Appl. No.: 12/725,104

(22) Filed: Mar. 16, 2010

(65) Prior Publication Data

US 2010/0247792 A1    Sep. 30, 2010

(30) Foreign Application Priority Data

Mar. 25, 2009   (JP) ................ P2009-074759

(51) Int. Cl.
*B05C 5/02* (2006.01)
*B05C 1/04* (2006.01)
*B05C 9/06* (2006.01)
(52) U.S. Cl. ......... 118/232; 118/230; 118/209; 118/200
(58) Field of Classification Search .............. None
See application file for complete search history.

(56) References Cited

U.S. PATENT DOCUMENTS

| | | | | |
|---|---|---|---|---|
| 4,455,327 A * | 6/1984 | Yoshida et al. | ........ | 427/131 |
| 5,030,484 A | 7/1991 | Chino et al. | | |
| 5,072,688 A | 12/1991 | Chino et al. | | |
| 5,417,181 A * | 5/1995 | Idstein et al. | ........ | 118/231 |
| 5,688,324 A * | 11/1997 | Umaba | ........ | 118/401 |
| 5,965,209 A * | 10/1999 | Komatsu et al. | ........ | 427/430.1 |
| 6,040,016 A * | 3/2000 | Mitani et al. | ........ | 427/72 |
| 6,214,409 B1 * | 4/2001 | Mitani et al. | ........ | 427/68 |
| 6,326,060 B1 * | 12/2001 | Ogawa | ........ | 427/382 |
| 2003/0049379 A1 * | 3/2003 | Kanke et al. | ........ | 427/355 |
| 2007/0059444 A1 * | 3/2007 | Hladik et al. | ........ | 427/180 |
| 2007/0122559 A1 * | 5/2007 | Shirakashi et al. | ........ | 427/457 |
| 2008/0095947 A1 * | 4/2008 | Kanke et al. | ........ | 427/407.1 |
| 2008/0295765 A1 * | 12/2008 | Emoto et al. | ........ | 118/56 |
| 2010/0075022 A1 * | 3/2010 | Emoto et al. | ........ | 427/58 |

FOREIGN PATENT DOCUMENTS

| | | |
|---|---|---|
| EP | 0 313 043 A2 | 4/1989 |
| JP | B2-06-049171 | 6/1994 |
| JP | A-2001-300394 | 10/2001 |

* cited by examiner

*Primary Examiner* — Dah-Wei Yuan
*Assistant Examiner* — Jethro Pence
(74) *Attorney, Agent, or Firm* — Oliff & Berridge, PLC

(57) ABSTRACT

A liquid application apparatus includes a guide roll for guiding a sheet for application, and a slit die for applying a liquid to a surface of the sheet for application from an opening. The slit die has an upper layer flow path and a lower layer flow path spaced in the rotational direction of the guide roll and joining at the opening. In a cross section perpendicular to the axis of the guide roll, an angle α formed by the center line of the upper layer flow path and the center line of the lower layer flow path is 0.5 to 25°, an angle β formed by a line connecting the intersection point of the center line of the upper layer flow path and the center line of the lower layer flow path with the axis of the guide roll and by the center line of the upper layer flow path is 0 to 70° as measured from this connecting line toward the center line of the upper layer flow path in the direction opposite to the rotational direction of the guide roll, and the distance γ between a point where the two flow paths and join and the opening is 0.05 to 2.8 mm.

3 Claims, 2 Drawing Sheets

LIQUID APPLICATION APPARATUS AND APPLICATION METHOD

BACKGROUND OF THE INVENTION

1. Field of the Invention

The present invention relates to a liquid application apparatus and application method.

2. Related Background Art

Liquid application apparatuses including a guide roll for guiding a sheet for application; and a slit die having a plurality of openings extending in the axial direction of the guide roll and applying two liquid layers (hereinafter referred to as an upper layer and a lower layer) to a surface of the sheet for application guided by the guide roll have been conventionally known (see, for example, Japanese Patent Laid-Open No. 2001-300394, Japanese Patent Publication No. 6-49171, and the like).

SUMMARY OF THE INVENTION

However, in the conventional liquid application apparatuses, the interface between the upper layer and the lower layer is not flat and undulates in many cases. When the interface undulates in this manner, the thickness of the lower layer is significantly nonuniform, which is not preferred, particularly when the lower layer is relatively thin (for example, 5 μm or less).

The present invention has been made in view of the above problem. It is an object of the present invention to provide a liquid application apparatus that can suppress undulation at the interface between the upper layer and the lower layer, and a liquid application method using the same.

An application apparatus according to the present invention includes a guide roll for guiding a sheet for application; and a slit die having an opening extending in the axial direction of the guide roll and applying a liquid to a surface of the sheet for application guided by the guide roll. The slit die has two flow paths spaced in the rotational direction of the guide roll and joining at the opening. In a cross section perpendicular to the axis of the guide roll, 1: an angle α formed by the center line of the upper layer flow path on the front side in the rotational direction of the guide roll, of the two flow paths, and the center line of the lower layer flow path on the back side in the rotational direction of the guide roll, of the two flow paths, is 0.5 to 25°, 2: an angle β formed by a line connecting the intersection point of the center line of the upper layer flow path and the center line of the lower layer flow path with the axis of the guide roll, and by the center line of the upper layer flow path is 0 to 70° as measured from this connecting line toward the center line of the upper layer flow path in the direction opposite to the rotational direction of the guide roll, and 3: the distance γ between a point where the two flow paths join and the opening is 0.05 to 2.8 mm.

According to the present invention, α, β, and γ satisfy the above-described requirements, and therefore, when liquids different from each other are fed to the two flow paths to form a laminate of two liquid layers on the surface of the sheet for application, undulation at the interface between the two layers can be suppressed.

Here, in the cross section perpendicular to the axis of the guide roll, the width of the upper layer flow path: the width of the lower layer flow path is preferably 3:2 to 3:1. Thus, when the lower layer is relatively thin, the undulation at the interface is easily suppressed.

Also, preferably, the slit die has an edge portion, opposed to the guide roll, on the front side in the rotational direction with respect to the opening, and the length δ of the edge portion along the rotational direction of the guide roll is 0.01 to 0.05 mm.

Thus, the undulation at the interface can be further suppressed.

Also, a liquid application method according to the present invention includes feeding a liquid having a solid concentration of 20 to 30 wt % to the lower layer flow path in the above-described liquid application apparatus.

In particular, when such a liquid having high solid concentration is used for the lower layer, the undulation at the interface easily becomes severe, and the lower layer often disappears in part. Even in such a case, a lower layer having high uniformity can be formed.

According to the present invention, it is possible to provide a liquid application apparatus that can suppress undulation at the interface between the upper layer and the lower layer, and a liquid application method using the same.

DESCRIPTION OF THE PREFERRED EMBODIMENTS

The preferred embodiment of the application apparatus of the present invention will be described below in detail with reference to the drawings. In the following description, like numerals indicate like or corresponding parts, and redundant description is omitted.

Figure 1:
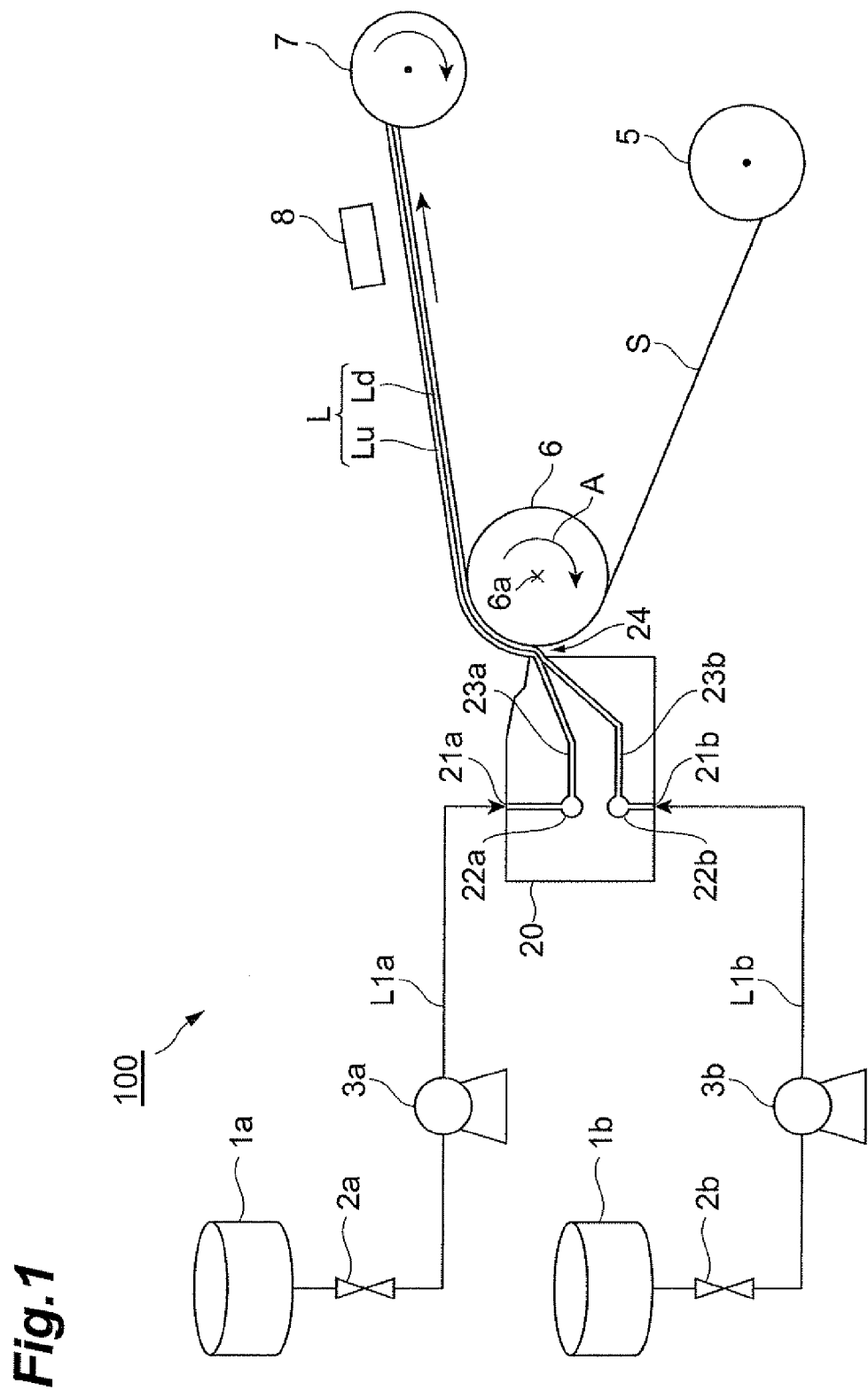
FIG. 1 is a schematic configuration view of an application apparatus according to an embodiment.

The application apparatus of the present invention mainly has liquid storage tanks 1a and 1b, liquid feed pumps 3a and 3b, a slit die 20, a feed reel 5 of a sheet for application, a guide roll 6, a take-up reel 7, and a dryer 8, as shown in FIG. 1, and simultaneously applies a laminate L having an upper layer Lu and a lower layer Ld to a sheet for application.

Liquids to be applied are respectively stored in the liquid storage tanks 1a and 1b. The liquids are not particularly limited, but, for example, a liquid for forming the active material containing layer of an electrochemical device, such as a lithium ion secondary battery, a liquid for forming a recording medium, and the like can be used. Examples of the liquid for forming an active material containing layer include a liquid including an active material, and a conductive aid, a binder, and a solvent as required. Examples of the active material include lithium containing metal oxide and a carbon powder. Examples of the conductive aid include carbon black and the like. Examples of the binder include PVDF and the like. Examples of the solvent include N-methylpyrrolidone (NMP), tetrahydrofuran (THF), N,N-dimethylformamide (DMF), and the like. The viscosity of the liquids can be, for example, in the range of 1 P to 500 P. The solid concentration of the application liquid fed to the liquid storage tank 1a for the upper layer, and the solid concentration of the liquid fed to the liquid storage tank 1b for the lower layer are not particularly limited. Generally, when the solid concentration is high, the interface between the upper layer Lu and the lower layer Ld described later undulates easily. This embodiment can be sufficiently implemented even if the solid concentration of the application liquids for the upper layer and for the lower layer is 20 to 30 wt %.

The liquid storage tank 1a and the inlet 21a of the slit die 20 are connected by a line L1a, and the liquid storage tank 1b and the inlet 21b of the slit die 20 are connected by a line L1b. The liquid feed pumps 3a and 3b, which respectively feed a constant amount of the liquids in the liquid storage tanks 1a and 1b to the slit die 20, are connected to the lines L1a and L1b. The liquid feed pumps 3a and 3b are not particularly limited, but precision gear pumps are preferred. Valves 2a and 2b are respectively connected to the lines L1a and L1b.

The guide roll 6 is a cylindrical rotatable roll. A sheet for application S fed from the feed reel 5 of a sheet for application and taken up around the take-up reel 7 is placed over the circumferential surface of this guide roll 6, and the guide roll 6 is rotated in the direction of an arrow A shown and guides the sheet for application S. The diameter of the guide roll 6 is not particularly limited, but, for example, the outer diameter can be 10 to 250 mm. The rotational speed of the guide roll 6 is not particularly limited, but is preferably set so that the linear velocity on the circumferential surface of the guide roll 6 is equal to the line speed (the flow speed of the sheet for application S).

The sheet for application S is not particularly limited, but examples of the sheet for application S include PET, PEN, aramid, and the like. Also, the thickness and width are not particularly limited, but can be, for example, 5 to 300 μm and 50 to 2000 mm, respectively.

Figure 2:
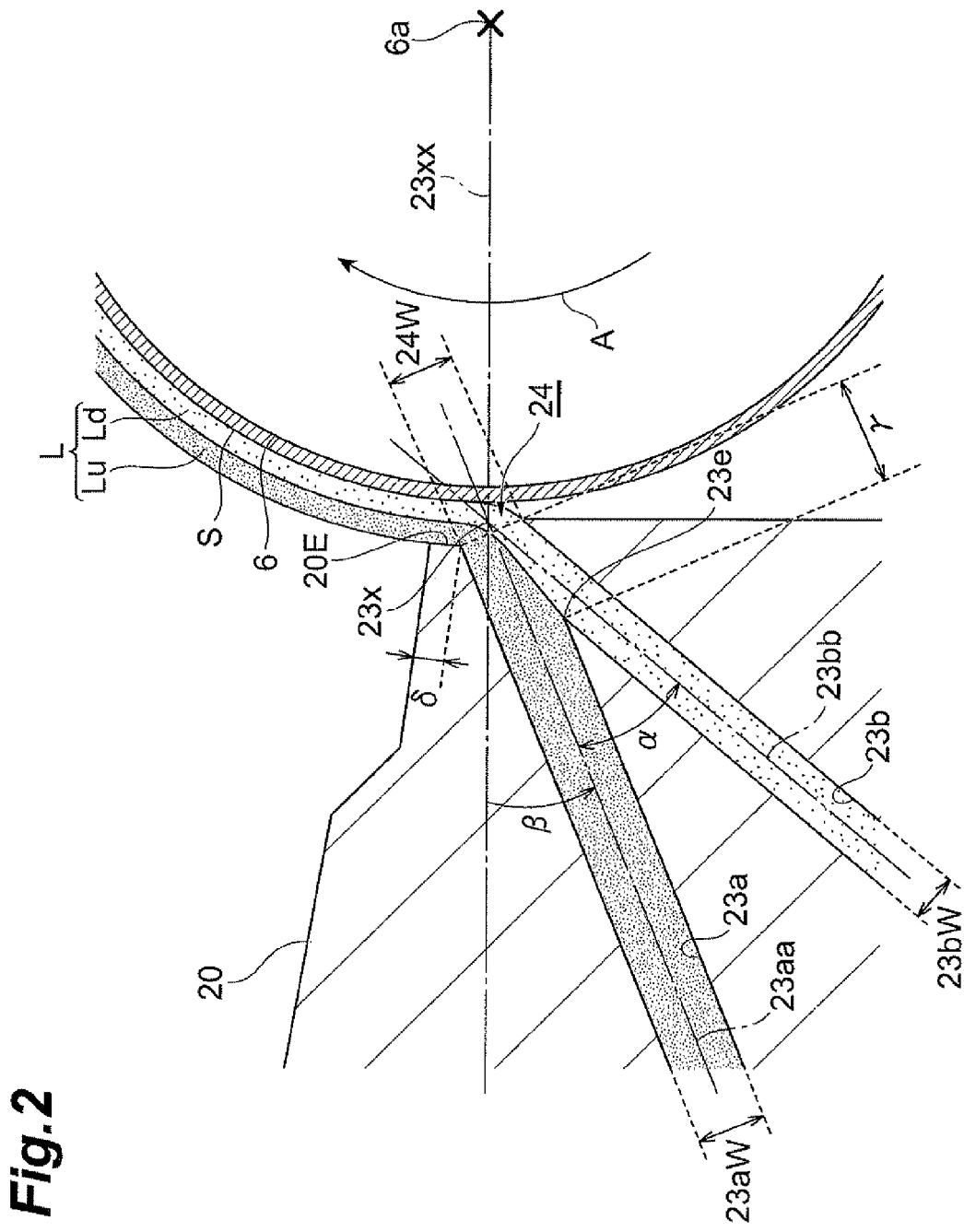
FIG. 2 is an enlarged cross-sectional view of a portion where a guide roll and a slit die in FIG. 1 are opposed to each other.

One opening 24 is formed in the slit die 20 along the axial direction of the guide roll 6, as shown in FIG. 1 and FIG. 2. This slit die 20 spreads the liquids flowed in from the inlets 21a and 21b of the slit die 20 in the width direction of the sheet for application S respectively in manifolds 22a and 22b, which are provided inside the slit die 20 as cavities and extend in the axial direction of the guide roll 6, passes the liquids through a slit-like upper layer flow path (a flow path on the front side in the rotational direction of the guide roll) 23a and a slit-like lower layer flow path (a flow path on the back side in the rotational direction of the guide roll) 23b to provide a layer-like upper layer and lower layer respectively, further joins the upper layer and the lower layer before the opening 24 so that the laminate L in which these two layers are laid on each other is fixated, then discharges this laminate in a sheet shape from the one opening 24, and applies the laminate L onto the sheet for application S moving on the guide roll 6. The laminate L formed on the sheet for application S is dried by the dryer 8 in midstream while being moved by the take-up reel 7. Examples of the dryer include a hot wire heater, a steam heater, an infrared heater, and the like.

Next, the vicinity of the opening 24 of the slit die 20 will be described in detail, referring to FIG. 2 in which the slit die 20 and the guide roll 6 are cut in a cross section perpendicular to the axis 6a of the guide roll 6.

The slit width 24W of the opening 24 of the slit die 20 is not particularly limited, but can be, for example, 30 to 500 μm. The slit width 24W is preferably equal to or less than the sum of the width 23aW of the upper layer flow path 23a and the width 23bW of the lower layer flow path 23b described later.

The upper layer flow path 23a and the lower layer flow path 23b are in communication with the opening 24 and join before the opening 24 in the liquid flow direction. In other words, a point 23e where the upper layer flow path 23a and the lower layer flow path 23b join is formed before the opening 24 in the liquid flow direction. Here, the joining point 23e is a point where two flows are first mixed and is the coupling portion of the side walls. The angle of the joining point 23e is preferably equal to α.

Here, the slit die 20 in this embodiment meets the following three requirements in a cross section perpendicular to the axis 6a of the guide roll 6.

1: An angle α formed by the center line 23aa of the upper layer flow path 23a and the center line 23bb of the lower layer flow path 23b is 0.5 to 25°.

2: An angle β formed by a line 23xx connecting the intersection point 23x of the center line 23aa of the upper layer flow path 23a and the center line 23bb of the lower layer flow path 23b with the axis 6a of the guide roll 6 and by the center line 23aa of the upper layer flow path 23a is 0 to 70° as measured from the connecting line 23xx toward the center line 23aa of the upper layer flow path 23a in the direction opposite to the rotational direction A of the guide roll 6.

3: The distance γ between the joining point 23e of the upper layer flow path 23a and the lower layer flow path 23b and the opening 24 is 0.05 to 2.8 mm. Here, the distance between the joining point 23e and the opening 24 is the length of a perpendicular line from the joining point 23e to a line defining the slit width W of the opening 24, that is, a line connecting one end and the other end of the opening 24 (or its extension line), in FIG. 2.

The width 23aW of the upper layer flow path 23a and the width 23bW of the lower layer flow path 23b are preferably in the range of the width of the upper layer flow path 23a: the width of the lower layer flow path 23b=3:2 to 3:1. Here, the width of the flow path is width in the direction perpendicular to the flow of the flow path in a plane perpendicular to the axis of the guide roll 6. Specifically, for example, the width of the upper layer flow path 23a can be 150 to 300 μm, and the width of the lower layer flow path 23b can be 50 to 100 μm.

An edge portion 20E opposed to the guide roll 6 is formed on the downstream side with respect to the opening 24 of the slit die 20 (the front side in the rotational direction of the guide roll). The present invention can be implemented even if the length δ of this edge portion 20E in the rotational direction of the guide roll 6 (hereinafter referred to as the length δ of the edge portion 20E) is, for example, 0.5 mm or more. But, the length δ of the edge portion 20E is preferably 0.01 to 0.05 mm in terms of further reducing undulation at the interface between the upper layer and the lower layer. Here, the length δ of the edge portion 20E is length along the circumferential surface of the guide roll 6.

In such an application apparatus 100, when the liquids from the liquid storage tanks 1a and 1b are fed to the slit die 20 by the liquid feed pumps 3a and 3b, the liquids are discharged, as the laminate L in which the upper layer Lu is laminated on the lower layer Ld, from the opening 24 via the manifolds 22a and 22b, and the upper layer flow path 23a and the lower layer flow path 23b, and applied in a sheet shape on the sheet for application S guided by the guide roll 6.

According to this embodiment, the above-described angles α and β and distance γ are suitable, and therefore, the undulation at the interface between the upper layer Lu and the lower layer Ld applied on the surface of the sheet for application S can be suppressed. The reason why such effect is obtained is not clear, but one reason is considered to be, for example, that the turbulent flow caused when the two liquids join is suppressed.

Therefore, the thickness of the upper layer Lu and the lower layer Ld, and the sum of these, i.e. the thickness of the laminate L, can be easily made uniform. On the other hand, when the angles α and β and the distance γ do not satisfy the above-described conditions, the undulation at the interface between the upper layer Lu and the lower layer Ld cannot be suppressed, and portions where the lower layer Ld is not formed are produced in some cases. In particular, when the average thickness after drying set for the lower layer Ld is about 1 to 10 μm, it is significantly difficult to uniformly apply the lower layer by a conventional application apparatus, but in this embodiment, a sufficiently uniform lower layer can be formed. Also, this embodiment can be implemented even if the viscosity of the upper layer and the lower layer is largely different, for example, the difference is about 8000 to 10000 cp.

In particular, in forming the electrode of an electrochemical device, it is necessary to form a layer of about 5 μm or less as a lower layer when a layer having higher resistance and thinner thickness than the current collector is formed between the main active material layer and the current collector to interrupt current. This embodiment is particularly suitable, for example, in such a case.

The present invention is not limited to the above embodiment, and various modifications can be made. For example, in the above embodiment, two liquid layers are laminated and discharged from the one opening 24, but three or more layers may be laminated.

EXAMPLES (Application Liquid for Upper Layer)

89 parts by mass of a ternary positive electrode material (LiNiMnCoO$_2$-lithium nickel manganese cobalt composite oxide) and 3 parts by mass of graphite (trade name: KS-6, manufactured by Lonza) as active materials, 3 parts by mass of carbon black (trade name: DAB, manufactured by DENKI KAGAKU KOGYO KABUSHIKI KAISHA) as a conductive aid, and 5 parts by mass of polyvinylidene fluoride (trade name: KYNAR 761, manufactured by ATFINA) as a binder were mixed and dispersed, and then, a suitable amount of N-methyl-pyrrolidone (NMP) as a solvent was introduced to adjust viscosity so that the solids were 25 wt %, to prepare a slurry application liquid for the upper layer.

(Application Liquid for Lower Layer)

90 parts by mass of iron lithium phosphate (LiFePO$_4$) and 10 parts by mass of polyvinylidene fluoride (trade name: KYNAR 761, manufactured by ATFINA) as a binder were mixed and dispersed, and then, N-methyl-pyrrolidone (NMP) as a solvent was introduced so as to obtain a solid concentration of 15, 20, 25, and 30 wt % for viscosity adjustment to prepare four types of slurry application liquids for the lower layer.

Examples 1 to 22 and Comparative Examples 1 to 4

Using a guide roll having a radius of 60.2 mm, and using a slit die, as shown in FIG. 2, having a slit width 24W of 300 μm, the application liquid for the upper layer (dry thickness: 80 μm) and the application liquid for the lower layer (dry thickness: 5 μm) were simultaneously applied to a surface of an Al sheet having a thickness of 21 μm and a width of 150 mm and dried to form a multilayer electrode. Here, α, β, γ, δ, and the combination of the width 23aW of the upper layer flow path and the width 23bW of the lower layer flow path in the slit die, and the solid concentration of the application liquid for the lower layer were as shown in Table 1. Also, the sheet feed speed was 15 m/min. In Example 3, the angle α was 0.5° by dividing two flow paths by a PET film. In Comparative Example 1, β was −1°, and this means that the center line 23aa of the upper layer flow path 23a was inclined on the front side in the rotational direction of the guide roll 6 with respect to the connecting line 23xx. In Comparative Example 4, two flow paths were not joined in one opening, and the layers were discharged from two independent openings.

(Evaluation)

SEM micrographs in cross sections parallel to the lamination direction of the multilayer electrode and parallel to the sheet feed direction were taken, and the interface between the upper layer and the lower layer, and the surface of the Al sheet were extracted by image processing. The distribution of the position of the interface was obtained, and the standard deviation of the position of the interface was obtained. The results are shown in Table 1.

In the Examples, the undulation at the interface was sufficiently suppressed. On the other hand, in the Comparative Examples, dripping in which the liquid for the lower layer was squeezed out on the back side in the rotational direction of the roll occurred, and the lower layer was extremely non-uniform.

TABLE 1

| | α (° C.) | β (° C.) | γ (mm) | δ (mm) | Upper layer flow path width (μm):lower layer flow path width (μm) | Solid concentration of application liquid for lower layer (wt %) | Standard deviation of position of layer interface (μm) |
|---|---|---|---|---|---|---|---|
| Example 1 | 20 | 70 | 0.5 | 0.03 | 180:70 | 25 | 2.81 |
| Example 2 | 20 | 47 | 0.5 | 0.03 | 180:70 | 25 | 2.72 |
| Example 3 | 0.5 | 45 | 0.5 | 0.03 | 180:70 | 25 | 2.03 |
| Example 4 | 2 | 45 | 0.5 | 0.03 | 180:70 | 25 | 2.12 |
| Example 5 | 5 | 45 | 0.5 | 0.03 | 180:70 | 25 | 2.33 |
| Example 6 | 10 | 45 | 0.5 | 0.03 | 180:70 | 30 | 1.15 |
| Example 7 | 20 | 45 | 0.5 | 0.03 | 180:70 | 35 | 2.42 |
| Example 8 | 20 | 45 | 0.5 | 0.03 | 180:70 | 25 | 1.45 |
| Example 9 | 20 | 45 | 0.25 | 0.03 | 180:70 | 25 | 1.21 |
| Example 10 | 20 | 45 | 0.05 | 0.03 | 180:70 | 25 | 1.63 |
| Example 11 | 20 | 45 | 0.5 | 0.03 | 180:70 | 15 | 2.38 |
| Example 12 | 24 | 45 | 0.5 | 0.03 | 180:70 | 20 | 1.83 |
| Example 13 | 25 | 45 | 0.5 | 0.03 | 180:70 | 25 | 2.25 |
| Example 14 | 25 | 45 | 0.5 | 0.03 | 180:100 | 25 | 2.33 |
| Example 15 | 20 | 45 | 1.5 | 0.03 | 180:70 | 25 | 2.45 |
| Example 16 | 30 | 45 | 0.5 | 0.03 | 180:70 | 25 | 2.49 |
| Example 17 | 20 | 40 | 0.5 | 0.03 | 180:70 | 25 | 2.47 |
| Example 18 | 20 | 30 | 0.5 | 0.03 | 180:70 | 25 | 2.67 |
| Example 19 | 20 | 30 | 0.5 | 0.03 | 180:110 | 25 | 2.74 |
| Example 20 | 20 | 20 | 0.5 | 0.03 | 180:70 | 25 | 2.71 |
| Example 21 | 20 | 45 | 2.8 | 0.03 | 180:70 | 25 | 2.82 |

TABLE 1-continued

|  | α (° C.) | β (° C.) | γ (mm) | δ (mm) | Upper layer flow path width (μm):lower layer flow path width (μm) | Solid concentration of application liquid for lower layer (wt %) | Standard deviation of position of layer interface (μm) |
|---|---|---|---|---|---|---|---|
| Example 22 | 20 | 5 | 0.5 | 0.03 | 180:70 | 25 | 2.87 |
| Example 23 | 20 | 0 | 0.5 | 0.03 | 180:70 | 25 | 2.93 |
| Example 24 | 20 | 45 | 0.25 | 0.01 | 180:70 | 25 | 2.11 |
| Example 25 | 20 | 45 | 0.25 | 0.05 | 180:70 | 25 | 2.08 |
| Example 26 | 20 | 45 | 0.25 | 0.5 | 180:70 | 25 | 2.94 |
| Example 27 | 20 | 45 | 0.25 | 0.009 | 180:70 | 25 | 2.85 |
| Example 28 | 20 | 45 | 0.25 | 0.51 | 180:70 | 25 | 2.92 |
| Comparative Example 1 | 20 | −1 | 0.5 | 0.03 | 180:70 | 25 | 3.12 |
| Comparative Example 2 | 20 | 45 | 3 | 0.03 | 180:70 | 25 | 3.35 |
| Comparative Example 3 | 45 | 0 | 0.5 | 0.03 | 180:70 | 25 | 3.69 |
| Comparative Example 4 | No joining | 45 | 0.5 | 0.03 | 180:70 | 25 | 4.15 |

What is claimed is:

1. A liquid application apparatus comprising:
a guide roll for guiding a sheet for application; and
a slit die having a surface opening extending in an axial direction of the guide roll and applying a liquid to a surface of the sheet for application guided by the guide roll,
wherein the slit die has two flow paths spaced in a rotational direction of the guide roll, the two flow paths being fluidly connected within the slit die so as to join at the surface opening,
in a cross section perpendicular to an axis of the guide roll,
an angle α formed by a center line of an upper layer flow path on a front side in the rotational direction of the guide roll, of the flow paths, and a center line of a lower layer flow path on a back side in the rotational direction of the guide roll, of the flow paths, is 0.5 to 25°,
an angle β formed by a line connecting an intersection point of the center line of the upper layer flow path and the center line of the lower layer flow path with the axis of the guide roll and by the center line of the upper layer flow path is 0 to 70° as measured from the connecting line toward the center line of the upper layer flow path in a direction opposite to the rotational direction of the guide roll, and
a distance γ between a point where the two flow paths join and the opening is 0.05 to 2.8 mm.

2. The liquid application apparatus according to claim 1, wherein in the cross section perpendicular to the axis of the guide roll, a width of the upper layer flow path: a width of the lower layer flow path is 3:2 to 3:1.

3. The liquid application apparatus according to claim 1, wherein the slit die has an edge portion, opposed to the guide roll, on the front side in the rotational direction with respect to the opening, and a length δ of the edge portion along the rotational direction of the guide roll is 0.01 to 0.05 mm.

* * * * *